United States Patent [19]
Tsuchida

[11] Patent Number: 5,627,598
[45] Date of Patent: May 6, 1997

[54] DISPLAY APPARATUS INCLUDING ASPECT RATIO CONVERTER AND CHILD PICTURE PROCESSING WITH FOUR FIELD SEQUENCE MEMORY

[75] Inventor: Susumu Tsuchida, Tokyo, Japan

[73] Assignee: Sony Corporation, Tokyo, Japan

[21] Appl. No.: 546,286

[22] Filed: Oct. 20, 1995

Related U.S. Application Data

[63] Continuation of Ser. No. 217,969, Mar. 25, 1994, abandoned.

[30] Foreign Application Priority Data

Mar. 30, 1993 [JP] Japan ................................ 5-093827

[51] Int. Cl.$^6$ ........................... H04N 5/45; H04N 5/445
[52] U.S. Cl. ..................... 348/567; 348/565; 348/556; 348/513
[58] Field of Search ........................... 348/563–568, 348/554–558, 588, 589, 598, 599, 584, 722, 443–445, 447, 458, 604, 449, 459, 513, 536, 550, 526, 715, 716, 718, 719; H04N 5/46, 5/45, 5/445, 5/44, 5/262, 5/265

[56] References Cited

U.S. PATENT DOCUMENTS

| 4,811,103 | 3/1989 | Casey | 348/567 |
|---|---|---|---|
| 4,996,595 | 2/1991 | Naito et al. | 348/447 |
| 5,065,243 | 11/1991 | Katagiri | 348/556 |
| 5,130,800 | 7/1992 | Johnson et al. | 348/564 |
| 5,132,793 | 7/1992 | Hirahata et al. | 348/556 |
| 5,168,362 | 12/1992 | Yoshida | 348/445 |
| 5,208,660 | 5/1993 | Yoshida | 348/567 |
| 5,289,284 | 2/1994 | Ersoz et al. | 348/567 |

FOREIGN PATENT DOCUMENTS

| 0304236 | 2/1989 | European Pat. Off. | H04N 5/45 |
|---|---|---|---|
| 0447167 | 9/1991 | European Pat. Off. | H04N 5/44 |
| 0573280 | 12/1993 | European Pat. Off. | H04N 5/45 |
| 05183833 | 7/1993 | Japan | H04N 5/45 |

OTHER PUBLICATIONS

Tsuchida et al., "Multi-Picture System for High Resolution Wide Aspect Ratio Screen," IEEE 1991 International Conference on Consumer Electronics, Digest of Technical Papers, Jun. 1991, pp. 252–253.

Tsuchida, et al., "Multi-Picture System for High Resolution Wide Aspect Ratio Screen", IEEE Transactions on Consumer Electronics, 87 (1991) Aug., No. 3, NY, US pp. 313–318.

*Primary Examiner*—Safet Metjahic
*Attorney, Agent, or Firm*—Jay H. Maioli

[57] ABSTRACT

A display apparatus wherein a video signal of a child picture read out at a double speed is inserted accurately with a high resolution into a parent picture of another video signal having a double frequency. Control signals for designating a write area and a read-out area of a four field sequence memory provided for forming a double speed field frequency is formed in accordance with odd/even number field discrimination signals for write and read-out video signals, a vertical synchronizing signal prior to double speed conversion and a double speed synchronizing signal for a parent picture so that, even when the parent picture is scrolled, passing of the read-out side memory area does not take place. Where the parent picture is formed from a video signal of the interlace system by a line double speed, the double speed child picture video signal is delayed, upon reading out in an even-numbered field, by one horizontal scanning period so that lines may be overlapped between the parent and child pictures.

14 Claims, 16 Drawing Sheets

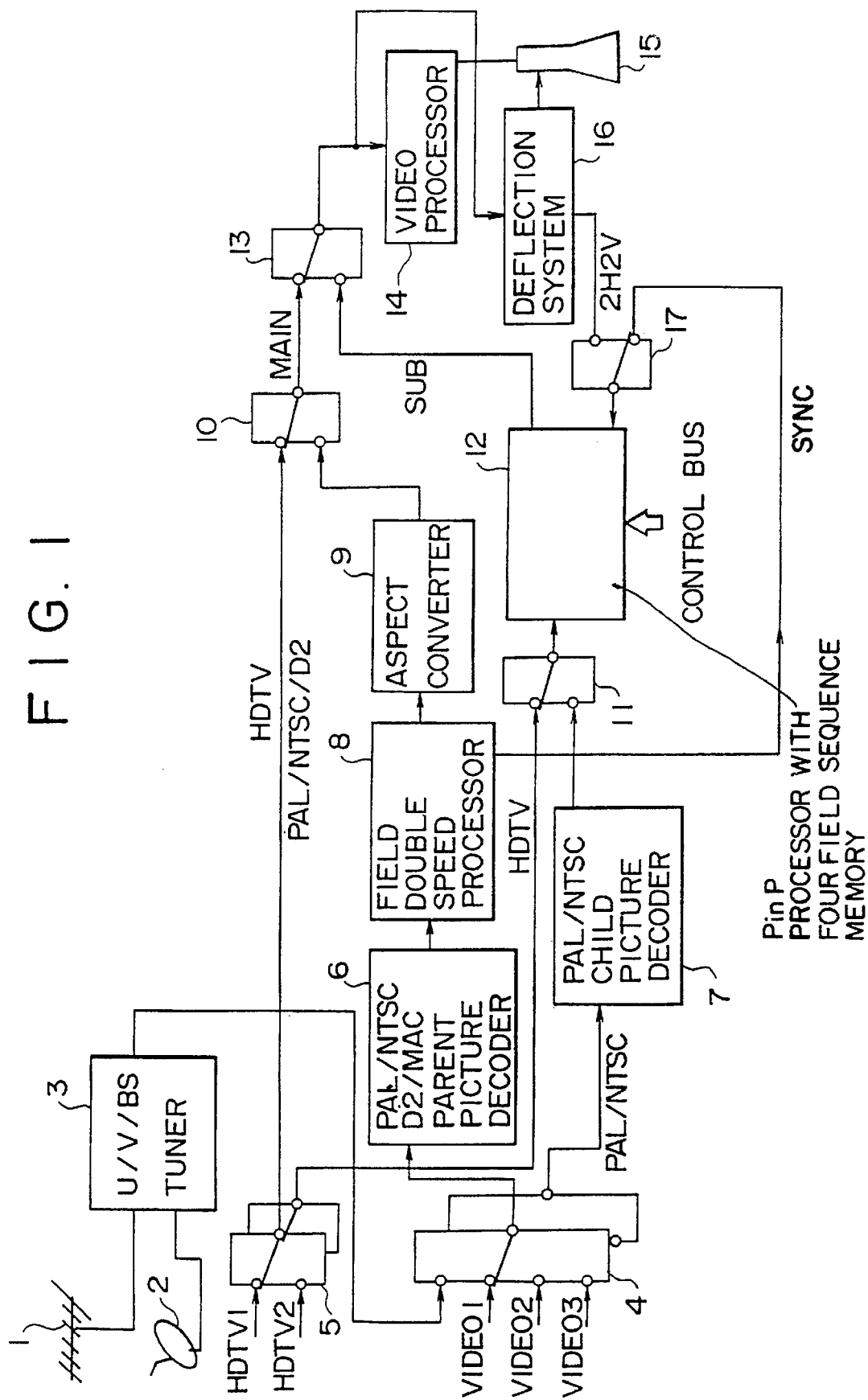

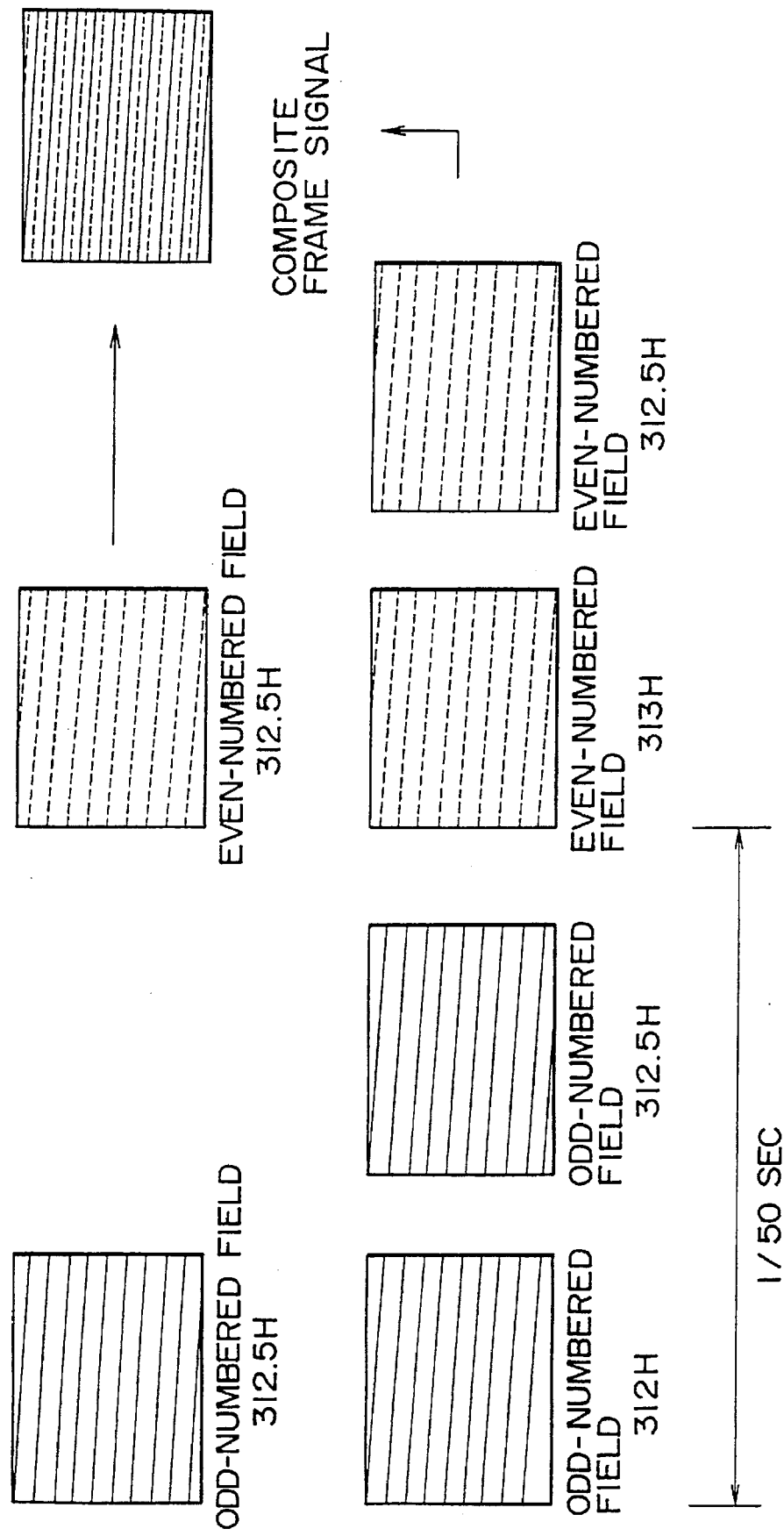

PoutP

CHANNEL INDEX

PinP IN THE ZOOM MODE

PinP 4:3 OR 16:9

WRITE AREA

AVOIDANCE OF PASSING OF THE MEMORY ADDRESS AT THE AREA 1

READ-OUT AREA

FOUR FIELD SEQUENCE MEMORY AREAS

| 256 X 2 = 512 DOTS | |
|---|---|
| AREA 0 | AREA 1 |
| AREA 2 | AREA 3 |

160 X 2 = 320 LINES

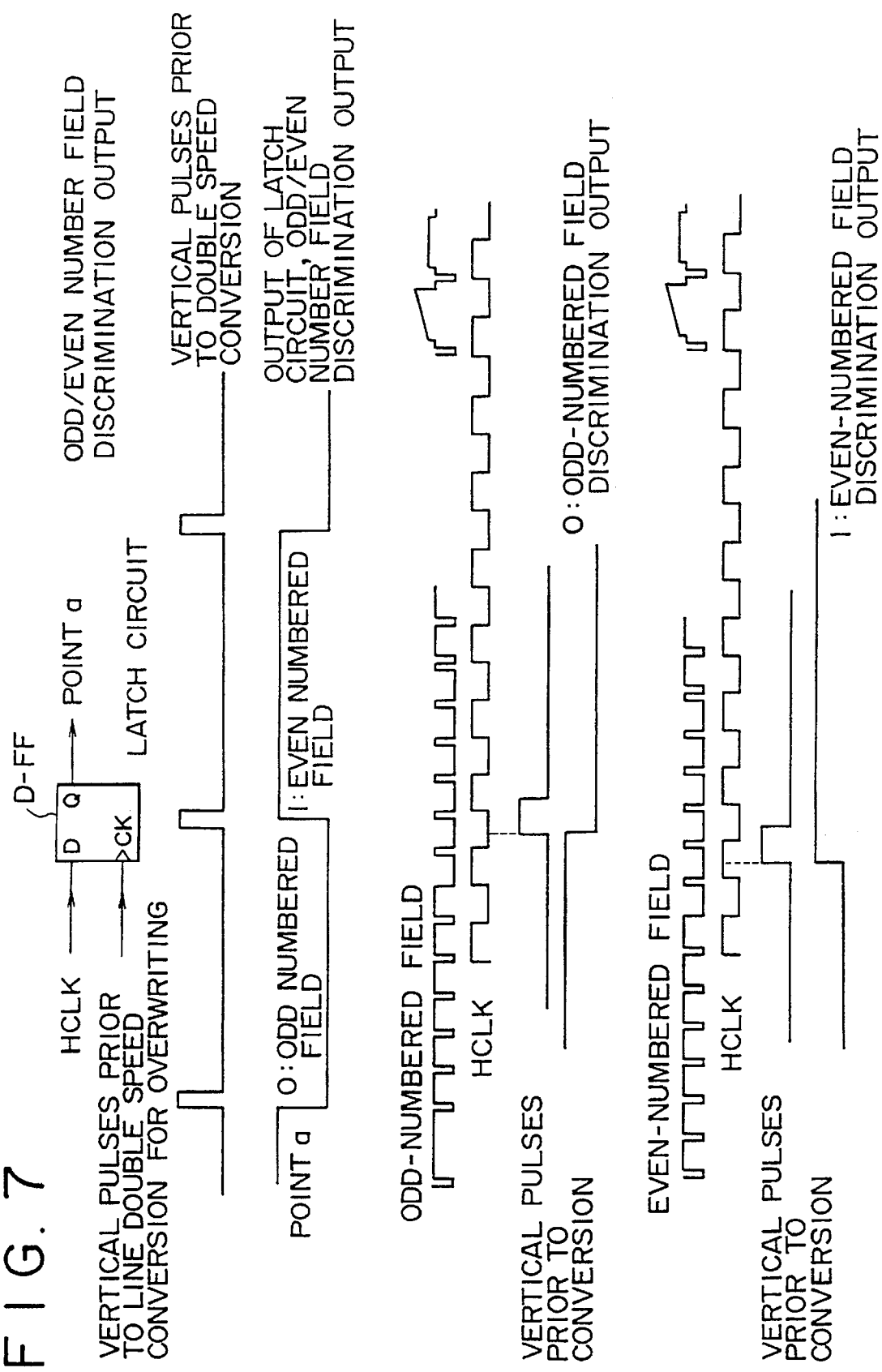
F I G. 7

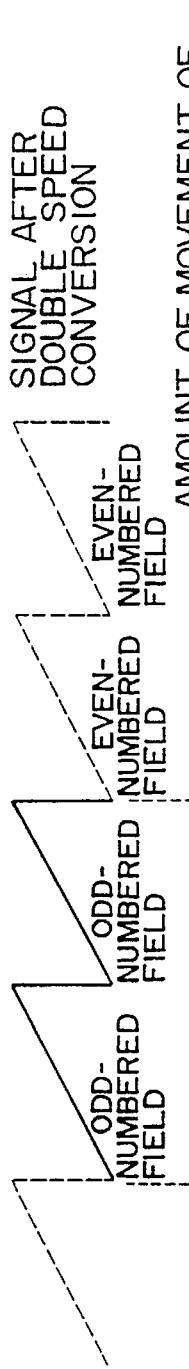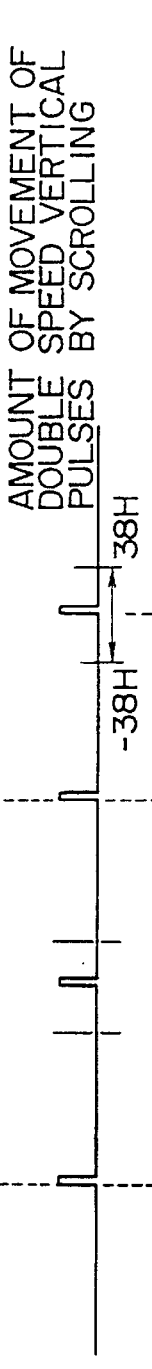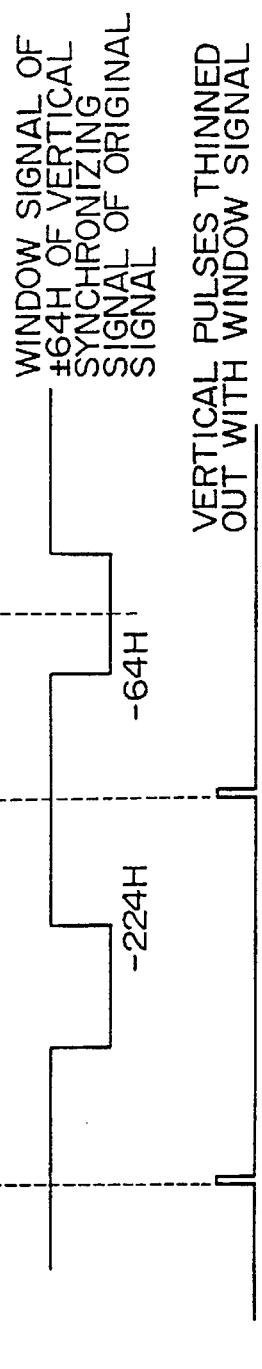
F I G. 8(A)
F I G. 8(B)
F I G. 8(C)
F I G. 8(D)
F I G. 8(E)
F I G. 8(F)

FIG. 9

| AREA NUMBER | | NEXT SEQUENCE IN STANDARD SIGNAL | |
|---|---|---|---|
| WRITE W1 W0 | READ-OUT R1 R0 | COINCIDENCE BETWEEN VERTICAL SYNCHRONIZING SIGNALS | INCOINCIDENCE BETWEEN VERTICAL SYNCHRONIZING SIGNALS |
| 0 0 | 0 0 | 1 x    0 y | 1 x    0 y |
| 0 0 | 0 1 | 0 x    1 y | 1 x    1 y |
| 0 0 | 1 0 | 0 x    1 y | 0 x    1 y |
| 0 0 | 1 1 | 0 x    0 y | 0 x    1 y |
| 0 1 | 0 0 | 1 x    0 y | 1 x    1 y |
| 0 1 | 0 1 | 1 x    1 y | 1 x    1 y |
| 0 1 | 1 0 | 1 x    1 y | 0 x    1 y |
| 0 1 | 1 1 | 1 x    0 y | 1 x    0 y |
| 1 0 | 0 0 | 1 x    0 y | 1 x    0 y |
| 1 0 | 0 1 | 1 x    1 y | 1 x    0 y |
| 1 0 | 1 0 | 1 x    1 y | 1 x    1 y |
| 1 0 | 1 1 | 1 x    0 y | 0 x    0 y |
| 1 1 | 0 0 | 0 x    0 y | 1 x    0 y |
| 1 1 | 0 1 | 0 x    1 y | 0 x    1 y |
| 1 1 | 1 0 | 0 x    1 y | 0 x    0 y |
| 1 1 | 1 1 | 0 x    0 y | 0 x    0 y |

(*) marks the second row.

FIG. 14
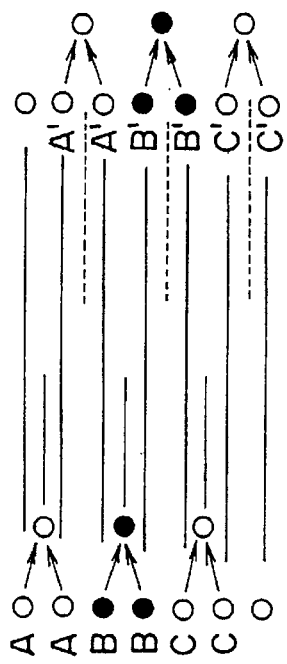
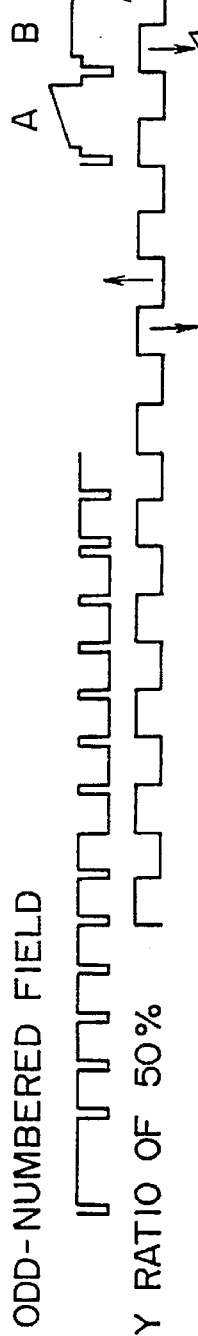
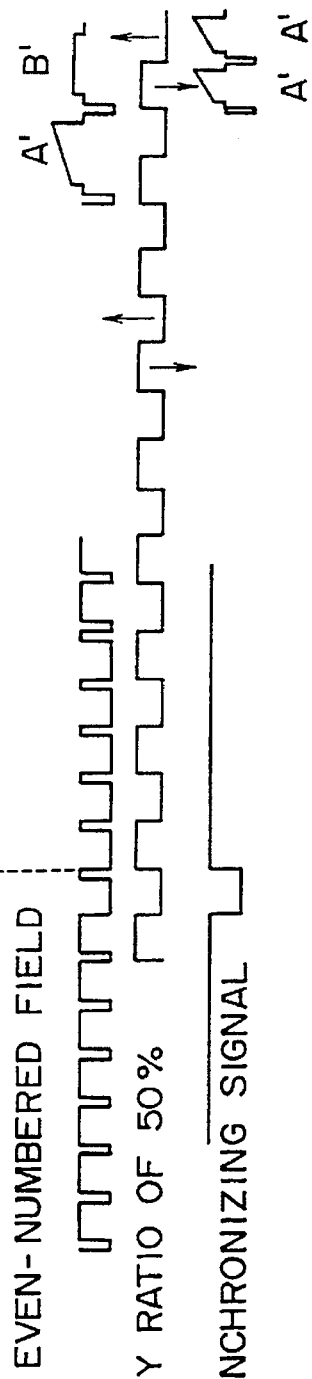

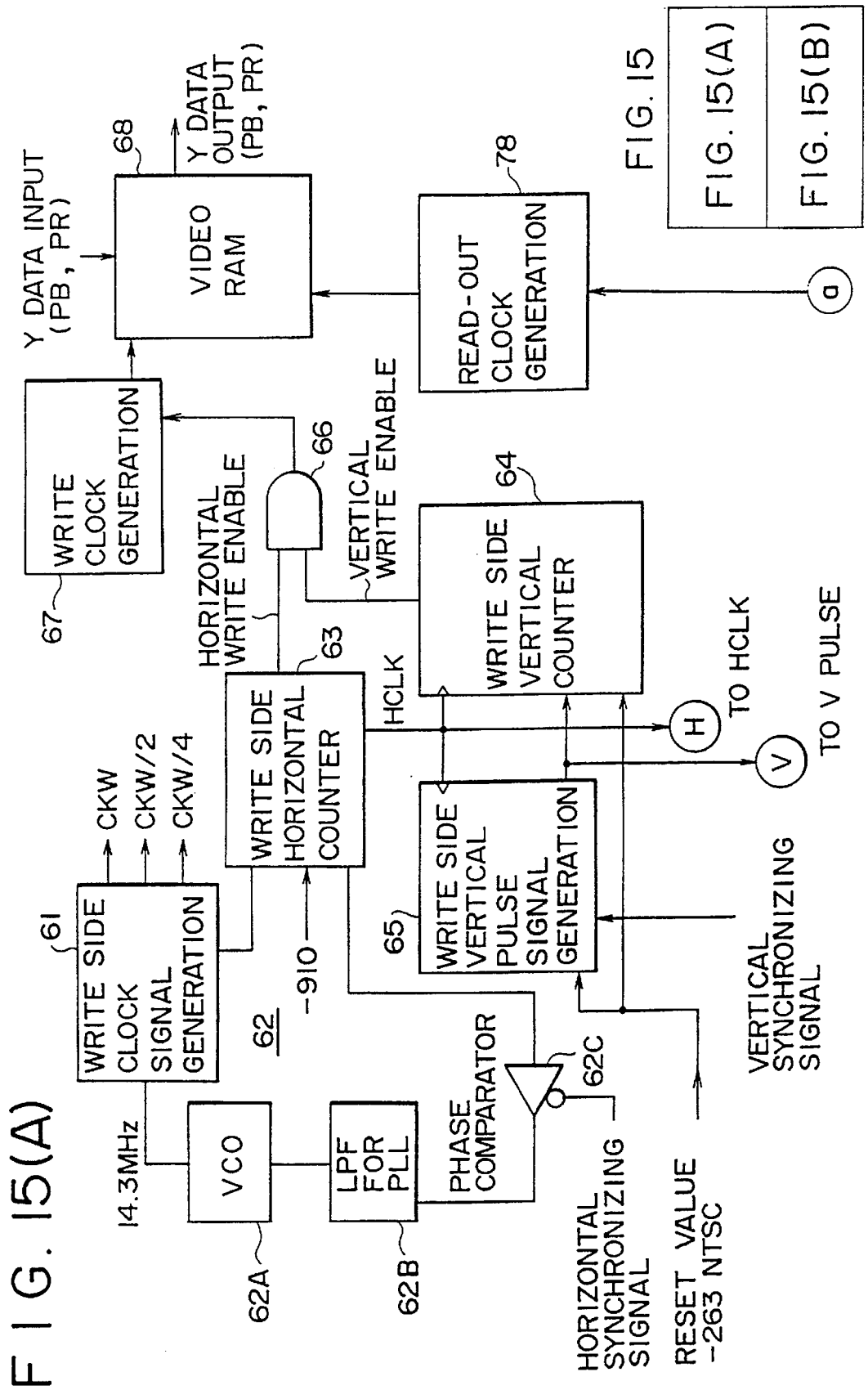

DISPLAY APPARATUS INCLUDING ASPECT RATIO CONVERTER AND CHILD PICTURE PROCESSING WITH FOUR FIELD SEQUENCE MEMORY

This is a continuation of application Ser. No. 08/217,969 filed Mar. 25, 1994, abandoned.

BACKGROUND OF THE INVENTION

1. Field of the Invention

This invention relates to a display apparatus for a double speed video signal wherein an input video signal is converted into another double speed image signal and a standard television signal is displayed together with a child picture on a screen of a television receiver, for example, for the high definition television system.

2. Description of the Related Art

When it is tried to display a television signal of a standard system such as the NTSC system, PAL system or SECAM system on a high definition television receiver, preferably a video signal is processed, according to the compatibility of the deflection system, at a double speed to display the image in a double field frequency or a double line frequency.

For example, the PAL/SECAM television system adopted in Europe employs a 2:1 interlace system of 625 lines/50 Hz, and accordingly, when a video signal of high brightness is displayed, a large screen flicker is usually seen. In order to eliminate this large screen flicker, it has been proposed to use double speed field display means which performs double speed processing to double the field frequency of a video signal to make a parent picture and repetitively display odd-/even-numbered field signals of 312.5 H and 312.5 H twice in different fields like odd-/odd-/even-/even-numbered fields of 312 H, 312.5 H, 313 H and 312.5 H.

Similarly, for the NTSC system, a superimposed line double speed system has been proposed wherein signals of odd-numbered and even-numbered fields of 262.5 H and 262.5 H are processed at a line double speed to produce field signals of 525 H and 525 H and upper and lower instances of horizontal lines which display the same signal are superimposed with each other so as to perform scanning equivalent to that of a normal interlace system. Such technique is disclosed, for example, in EP 0,482,894, A2.

A similar technique is disclosed in EP 0,551,168, A1 wherein a television signal of a standard television system is displayed together with a child picture on a screen of a television receiver of, for example, the high definition television system.

However, where it is tried to simultaneously display a child picture in a superimposed condition on a parent picture processed by double speed signal processing in such a manner as described above, the following problems are encountered.

A. Where the parent picture is a field double speed picture:
1. Also a child picture to be inserted into the parent picture must necessarily be processed by field double speed processing, and to this end, it has been proposed to determine a sequence of read-out areas of a four field sequence memory using a normal speed vertical synchronizing signal as a clock signal for the four field sequence memory for displaying a child picture at a field double speed, latch the child picture signal in response to a vertical synchronizing pulse signal of a double speed to that of the deflection system to delay the child picture by a time corresponding to one field of the double speed and use the thus delayed child picture signal as a control signal for a read-out memory area for the child picture. However, it sometimes occurs that a control signal for a write memory area exhibits overlapping by a time equal to the delay time, and there is a problem in that the memory area which undergoes writing and the memory area which undergoes reading out coincide with each other to cause passing of a memory address for a child picture with the probability of ⅛.
2. One of simple methods of processing a parent picture by double speed processing by four times for odd-numbered, odd-numbered, even-numbered and even-numbered fields is a field display mode wherein only one of the odd-numbered and even-numbered fields of a child picture video signal written in a memory is repetitively read out and displayed by four times. The method, however, has a problem in that motion of the child picture is skipped by one field and the vertical resolution of the child picture is reduced to one half or less than that of ordinary frames.

B. When a parent picture is converted into a line double speed video signal and a display picture of the interlace system is produced by superimposition:
1. Since the superimposed line double speed conversion system basically involves non-interlace conversion timings, there is a problem in that discrimination between odd- and even-numbered fields is impossible after conversion into picture of a double speed and, when a child picture video signal is converted, after such double speed conversion, into a signal of a double speed and then displayed, the interlace of child picture images is reversed with the probability of ½.
2. It may be possible to shift, in a zoom mode wherein a 4:3 video signal is displayed fully on a 16:9 video screen by over-scanning of the upper and lower portions of the 4:3 video signal by a vertical deflection system, a video signal of a child picture prior to double speed conversion so as to be superimposed on a video signal of a parent picture to effect line double speed processing. In this case, however, such complicated scanning is involved that, when a zoomed display picture of the parent picture is scrolled, it is shifted, for example, in the opposite direction so that the position of the child picture may not be varied.
3. When a parent picture is processed by line double speed processing and the signal obtained by the line double speed processing is superimposed to obtain an image of the interlace system, the upper and lower lines of same signal portions of the video signal after double speed conversion are superimposed in the opposite directions to each other between odd- and even-numbered fields by a deflection system. In this case, there is a problem in that, if a child picture processed by field double speed processing is displayed in a superimposed relationship on the double speed image signal, when the odd-numbered field is normal, the superimposition of the upper and lower lines of the child picture in the even-numbered fields is reversed.

SUMMARY OF THE INVENTION

It is an object of the present invention to provide a display apparatus wherein a video signal of a child picture read out at a double speed is inserted accurately with a high resolution into a parent picture of another video signal having a doubled frequency.

In order to attain the object described above, according to an aspect of the present invention, there is provided a display apparatus, which comprises frequency conversion means for converting a video signal of a parent picture into another video signal of a double speed field frequency, aspect ratio conversion means for converting the aspect ratio of the video signal whose field frequency has been converted by the frequency conversion means, child picture processing means for converting a video signal for a child picture into another video signal of the double speed field frequency, display means for inserting the video signal outputted from the child picture processing means into the video signal outputted from the aspect ratio conversion means and displaying the resulted video signal on a scanning screen, thinning out means for thinning out a double speed synchronizing signal for scanning the display means with a window signal of a predetermined width centered at a vertical synchronization position prior to conversion to the double speed, and a control circuit for forming an area control signal for a four field sequence memory constituting the child screen processing means from a vertical pulse signal outputted from the thinning out means and controlling write and read-out areas of the four field sequence memory in accordance with the area control signal so as to display the child picture free from passing of the memory address.

With the display apparatus, a double speed vertical synchronizing pulse signal after field conversion is thinned out with a window signal of the predetermined width centered at a vertical synchronization position prior to conversion to the double speed and then a clock signal for the four field sequence memory for displaying a child picture is formed from the signal obtained by the thinning out operation. Consequently, even when the parent picture is scrolled, an overlap on the write side memory area and the readout side memory area of the four field sequence memory is avoided, and a child picture display of a high picture quality free from passing of the memory address can be achieved.

Further, a video signal having odd- and even-numbered fields is written into the double speed conversion memory for a child picture and can be displayed in a correctly interlaced condition on the video signal of the parent picture of the double speed of odd-/odd-/even-/even-numbered fields. Consequently, a child picture display of high quality and free from deterioration of the vertical resolution can be achieved.

According to another aspect of the present invention, there is provided a display apparatus, which comprises line frequency conversion means for converting a video signal of a parent picture for one horizontal period into another video signal of a double speed line frequency, aspect ratio conversion means for converting the video signal whose line speed has been converted by the line frequency conversion means into another video signal having a predetermined aspect ratio, child picture processing means for converting a video signal of a child picture into another video signal of the double speed in units of a field, display means for inserting the video signal outputted from the child picture processing means into the video signal of the double speed outputted from the aspect ratio conversion means and displaying the resulted video signal in a superimposed condition on a scanning screen, and a control circuit for discriminating a field of the video signal read out by the child picture processing means using a synchronizing signal prior to the double speed conversion and delaying outputting of the picture displaying timing for an even-numbered field by one horizontal period.

With the display apparatus, a parent picture is displayed, after line double speed conversion thereof, in a zoom mode with a video signal of 4:3 on the display screen of 16:9, and a child picture video signal whose displaying position is fixed is mixed with the parent picture. Consequently, even when the parent picture is scrolled upwardly or downwardly in a vertical direction, the vertical position of the child picture is prevented from varying. Further, when the parent picture is processed by superimposition line double speed processing and then displayed and the child picture processed by field double speed processing is superimposed on the parent picture, the read-out timing on the even-numbered field side is delayed by one horizontal period. Consequently, superimposition of upper and lower lines of the child picture is performed regularly.

Further, since odd- and even-numbered fields are discriminated from each other using a vertical pulse signal and a horizontal clock signal prior to double speed processing, discrimination between odd- and even-numbered fields, which has been impossible with a method which uses a double speed horizontal pulse signal after superimposition line double speed conversion and a vertical pulse signal, can be performed, and consequently, when it is tried to insert a child picture of the field double speed into a parent picture of the light double speed, interlacing of the video portion of the child picture is always assured.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 1 is a block diagram showing general construction of a television receiver to which the present invention is applied;

FIG. 2 is a diagrammatic view illustrating double speed processing for doubling a field frequency;

FIG. 7 is a circuit diagram showing an odd/even number discrimination circuit of the read-out section shown in FIG. 6 and a waveform diagram illustrating operation of the odd/even number discrimination circuit;

FIGS. 8(A) to 8(F) are waveform diagrams illustrating the phase relationship between an original signal before conversion and a signal after field double speed conversion;

FIG. 9 is a table illustrating control signals for designating write and read-out areas of the four field sequence memory in a combination of standard signals;

FIG. 14 is a waveform diagram illustrating superimposition of signals performed in the multi-standard receiver shown in FIG. 12; and FIGS. 15A and 15B are block diagram of a control circuit employed in the multi-standard receiver shown in FIG. 12 for reading out an image of a child picture in synchronism with a parent picture of a line double speed.

DETAILED DESCRIPTION OF THE PREFERRED EMBODIMENTS

Figure 3A:
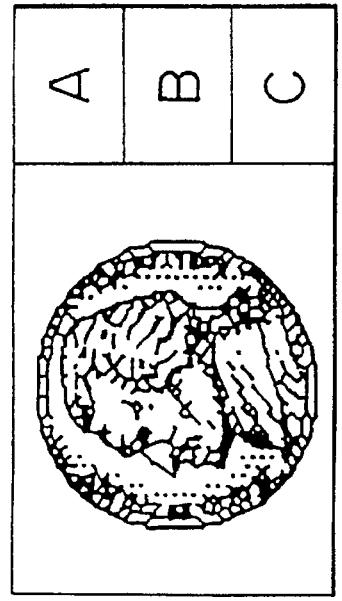
FIGS. 3(A) to 3(D) are schematic illustrations showing display pictures when a child picture or child pictures are superimposed on a video picture processed by field conversion processing.

Referring first to FIG. 1, there is shown a general construction of a television receiver to which the present invention is applied. The television receiver shown includes an antenna 1 for receiving UHF (ultra high frequency) and VHF (very high frequency) television radio waves and another antenna 2 for receiving satellite broadcasting radio waves. A tuner 3 detects radio waves received by the antennae 1 and 2 and supplies its output to an input terminal of a switch 4.

In addition to the output of the tuner 3, a video signal is supplied to the switch 4 from a video tape recorder or a like apparatus, not shown, and the switch 4 outputs a selected one of the video signals thus inputted thereto to a decoder 6 and another decoder 7. The decoder 6 decodes a video signal for a parent picture supplied thereto from the switch 4 and outputs the decoded video signal to a field double speed processing section 8.

In the present embodiment, the decoder 6 is constructed so that it can decode any video signal from among the PAL system, the NTSC system and the D2-MAC system. The field double speed processing section 8 converts a video signal inputted thereto into another signal having a field frequency double that of the inputted video signal and outputs the resultant signal. An aspect ratio converter 9 changes the aspect ratio of the video signal having the double field frequency and outputs the resultant video signal. For example, the aspect ratio converter 9 can output a signal of a picture of the aspect ratio of 4:3 as another signal of another picture of the aspect ratio of 16:9. However, when the aspect ratio converter 9 receives a signal of a picture of the aspect ratio of 16:9, it outputs the signal as it is.

A switch 5 selects one of signals of the HD-MAC system and the HDTV (high definition television) system supplied thereto from apparatus not shown and outputs the selected signal to a pair of switches 10 and 11. The switch 10 selects one of the outputs of the aspect ratio converter 9 and the switch 5 and supplies the selected output to a video processor 14 by way of a switch 13. The output of the video processor 14 is outputted to a CRT (cathode ray tube) 15.

Meanwhile, the decoder 7 decodes a video signal selected by the switch 4 and supplies the decoded video signal to a field double speed processing circuit 12 for a child picture by way of the switch 11.

The field double speed processing circuit (hereinafter referred to as the PinP processor) 12 for a child picture performs double speed processing to double the field frequency of a video signal using a four field sequence memory as hereinafter described. The PinP processor 12 detects a vertical synchronizing signal (V) and a horizontal synchronizing signal (H) for display of a parent picture and uses them as control signals for the memory.

A double speed video signal for a child picture generated by the PinP processor 12 is supplied to the other input terminal of the switch 13. After the switch 13 is changed over at a predetermined timing, the PinP processor 12 composes the double speed video signal for a child picture into a child picture in a parent picture and supplies the child picture in the parent picture to the video processor 14. A deflection system 16 detects a vertical synchronizing signal and a horizontal synchronizing signal from the output of the switch 13 and controls scanning of the CRT 15 in response to the thus detected synchronizing signals. A switch 17 selects a vertical synchronizing signal and a horizontal synchronizing signal outputted from the field double speed processing section 8 or the deflection system 16 and having a field frequency prior to double speed conversion and outputs the selected synchronizing signals to the PinP processor 12.

FIG. 2 illustrates double speed processing to double a field frequency. In the case of a 2:1 interlace signal of the PAL or SECAM system of 625 lines and 50 Hz, the signal is read out using a double speed clock signal such that an odd-numbered field is read out twice with 312 H and 312.5 H and an even-numbered field is also read out twice with 313 H and 312.5 H so that the signal is converted into another 2:1 interlace signal of 625 H and 100 Hz. It is to be noted that, in the case of a video signal of the NTSC system which is a 2:1 interlace signal of 525 lines and 60 Hz, the signal is converted into a signal of the field frequency of 120 Hz with 262 H, 262.5 H, 263 H and 262.5 H lines and then into a 2:1 interlace scanning signal.

Figure 3B:
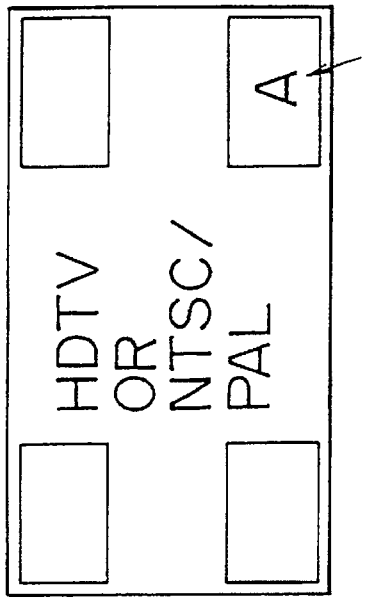
Figure 3C:
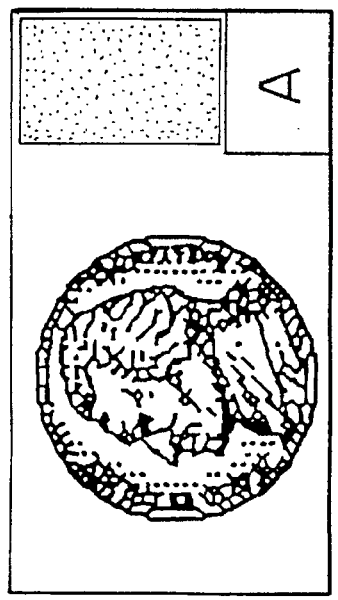
Figure 3D:
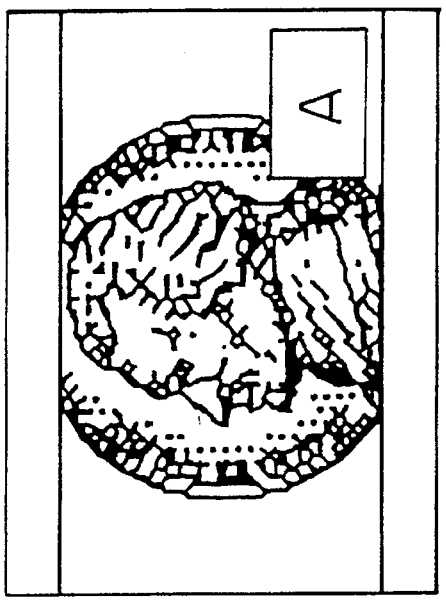

FIGS. 3(A) to 3(D) show pictures when a child picture is composed with an image picture processed by such field conversion processing as described above. In particular, FIG. 3(A) shows an example (PoutP) wherein a PAL signal 1/9 the size of the parent picture is outputted as a child picture A on the outside of the parent picture while FIG. 3(B) shows another example wherein three artificial moving pictures A, B and C are outputted as channel indices on the outside of the parent picture. Continuing, FIG. 3(C) shows a further example (PinP) wherein a child picture A is inserted into a parent picture on a screen of 16:9 outputted by overscanning an image signal of 4:3. In the screen shown in FIG. 3(C), the child picture A may remain at a fixed position even when the parent picture is scrolled. Further, FIG. 3(D) shows a manner wherein a child picture (16:9) A is moved in a parent picture.

Figure 4:
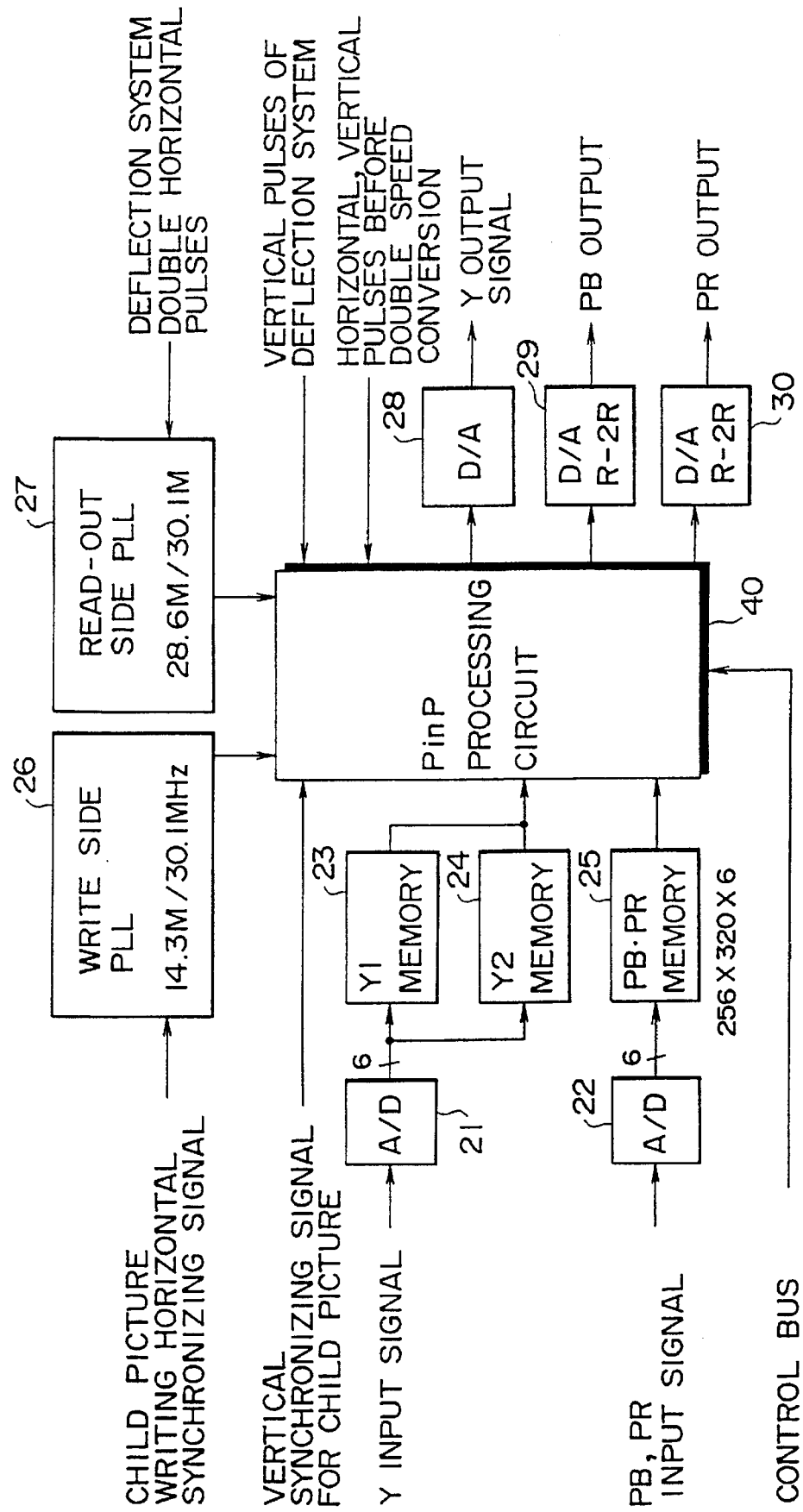
FIG. 4 is a block diagram showing an apparatus for performing field double speed processing for a child picture to allow such superimposition as illustrated in FIGS. 3(A) to 3(D)

FIG. 4 shows in block diagram an apparatus (PinP processor) which performs field double speed processing of a child picture for realizing such a PinP function as described above. Referring to FIG. 4, a brightness signal Y, which is one the video signals for a child picture outputted from the switch 11, is inputted to an analog to digital (A/D) converter 21 and then written alternately for each picture element into a pair of memories 23 and 24. Meanwhile, color difference signals PB and PR, which are the remaining signals from the switch 11, are converted from analog signals into digital signals by an analog to digital converter 22 and then written into a memory 25.

A horizontal synchronizing signal for a child picture is inputted to a write side PLL (phase-locked loop) circuit 26, which generates, when the horizontal synchronizing signal is of the standard television system, a writing clock signal with a frequency of 14.3 MHz in synchronism with the horizontal synchronizing signal. A processor 40 controls writing operations into the memories 23 to 25 in synchronism with the writing clock signal generated from the PLL circuit 26. Data of 256 picture elements per one line are inputted for 320 lines into each of the memories 23 to 25. Each of such picture elements is constituted from data of 6 bits.

In the meantime, a read-out side PLL circuit 27 generates a clock signal with a frequency of 28.6 MHz in synchronism with a horizontal synchronizing signal included in a video signal for a parent picture inputted thereto from the switch 17, and outputs the clock signal and a vertical synchronizing signal H, V for a parent picture prior to double speed conversion to the processor 40.

Also a 2 V (double speed vertical) synchronizing signal of the deflection system is supplied to the processor 40 and forms a reading out timing for a memory. The processor 40 reads out data written in the memories in response to the synchronizing signals mentioned above. A brightness signal Y of the data thus read out is converted by and outputted from a digital to analog (D/A) converter 28 while color difference signals PB and PR are converted by and outputted from a pair of digital to analog converters 29 and 30, respectively.

The brightness signal Y is alternately written into the memories 23 and 24 such that, for example, if data of the first picture element is written into the memory 23, data of the next second picture element is written into the memory 24 so as to handle the higher transfer rate. However, where the recording and reading out operation of a memory is sufficiently rapid, a single memory may be employed for four fields. In this manner, data of a first frame are constituted from data of a first field written into an area 0 of 128×160 of the four field sequence memory and data of a second field of 128×160 written in another area 1 as seen in FIG. 5(C). Similarly, data of a second frame are constituted from data of a first field of 128×160 written in a further area 2 and data of a second field of 128×160 written in a still further area 3.

Figure 5A:
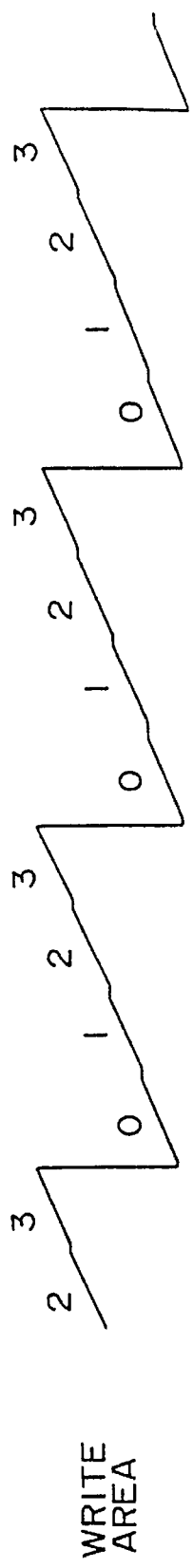
FIGS. 5(A) to 5(C) are waveform diagrams illustrating writing operations for a four field sequence memory.
Figure 5B:
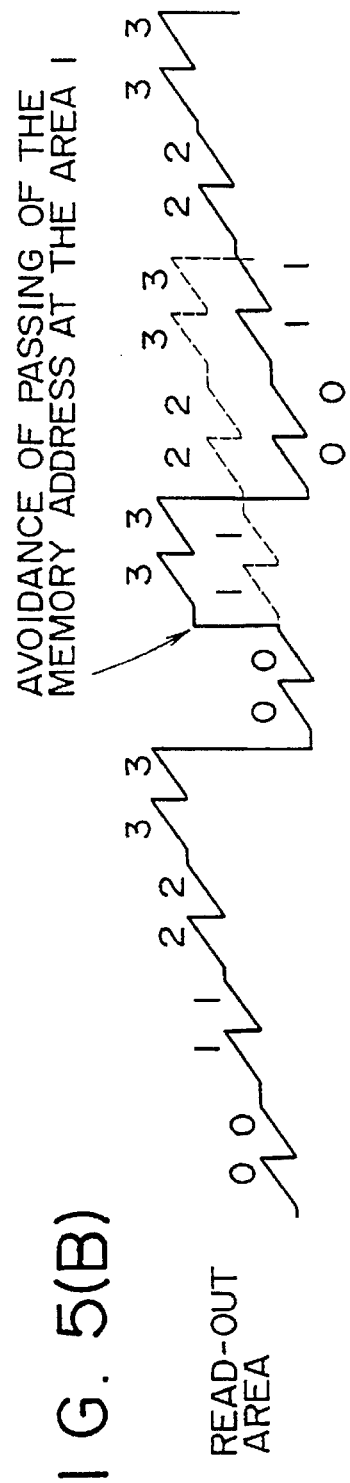
Figure 5C:
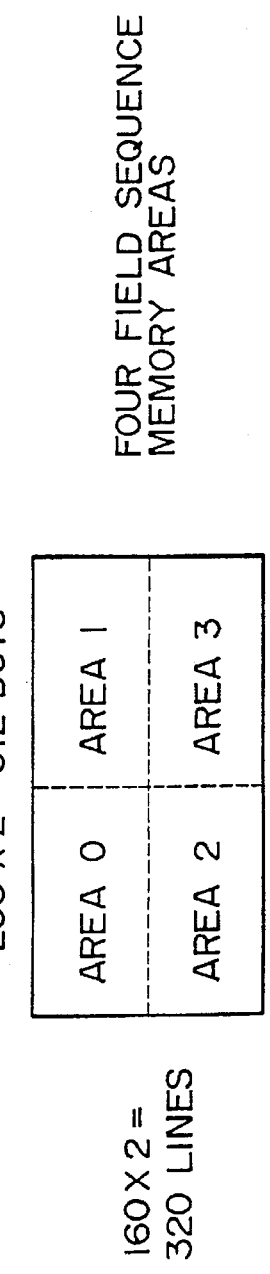

The writing operation is performed successively in the order of the area 0, area 1, area 2 and area 3 as seen from FIG. 5(A). On the other hand, the reading out operation is performed, in an ordinary sequence, successively in the order of area 0, area 1, area 2 and area 3 as seen in FIG. 5(B) in response to a double speed clock signal. In this case, however, in area 1 in which memory passing takes place upon such reading out, a control signal which designates a memory read-out area is formed so that reading out of, for example, area 3 is repetitively performed twice.

The reading out control for the four fields is performed such that, as hereinafter described, designation of an area for reading out of the memory is controlled by a control circuit so that, into whatever relationship the field timings of a parent picture and a child picture enter, data for the child picture to be read out from the four field sequence memory may not cause passing.

Figure 6:
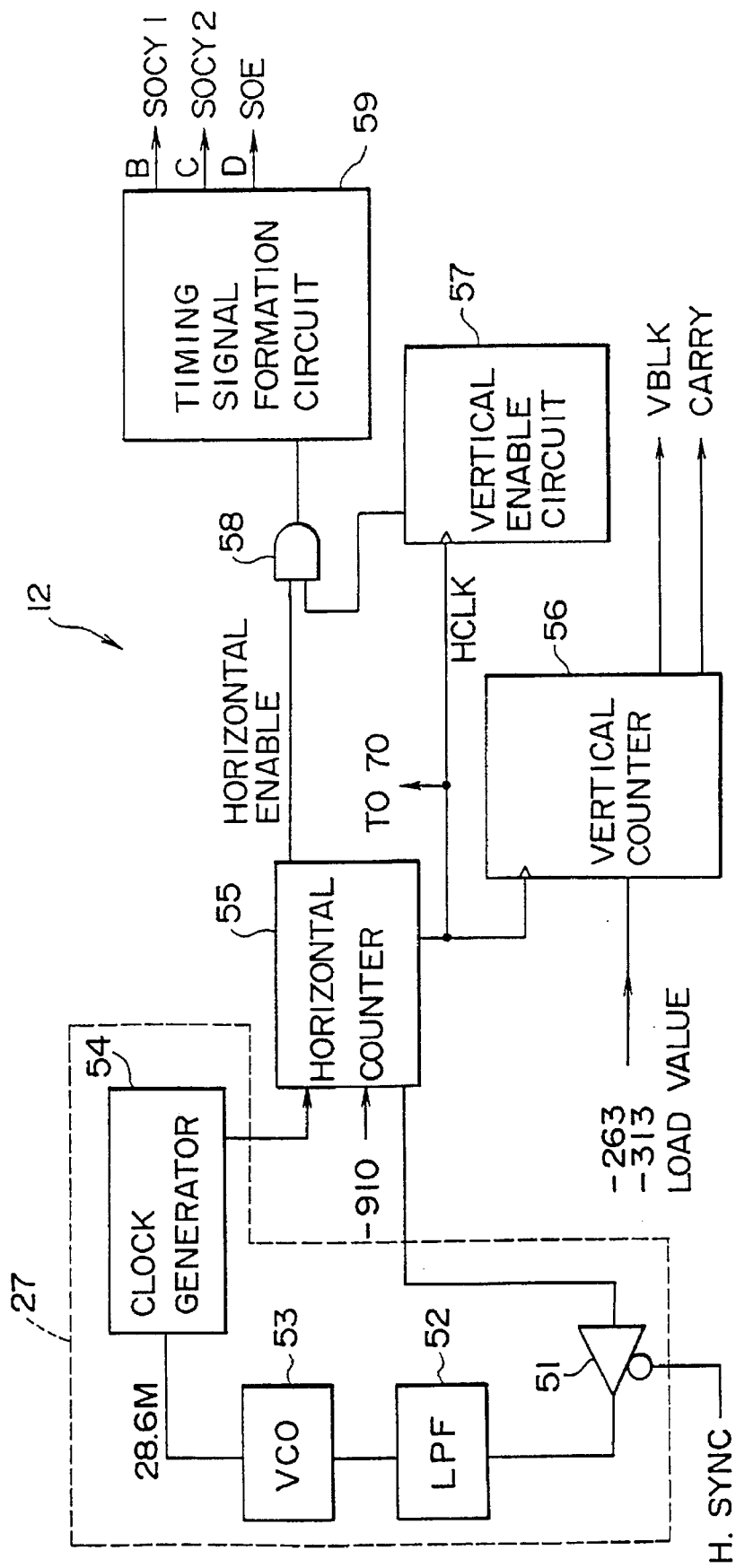
FIG. 6 is a read-out section of the apparatus shown in FIG. 4.

FIG. 6 shows an example of a construction of a read-out side section of the PinP processor 12 shown in FIG. 1. Referring to FIG. 6, the PinP processor 12 shown includes a PLL circuit 27 which generates a clock signal synchronized with a double speed horizontal (2 H) pulse signal supplied thereto from the deflection system 16. In particular, the PLL circuit 27 includes a phase comparator 51 to which the 2 H pulse signal is inputted, a low-pass filter 52, a VCO (voltage-controlled oscillator) 53, a clock generator 54 and a horizontal (H) counter 55.

The clock generator 54 generates a clock signal accurately for 910 dots within one horizontal period of a video signal for a parent picture. The clock signal is divided into 1/455 increments by the H counter 55, which thus outputs an H clock signal of the duty ratio of 50%. The H clock signal is supplied to a vertical (V) counter 56 for forming a row address. The V counter 56 is reset in response to the double speed vertical synchronizing signal 2 V of the deflection system 16 to establish synchronization in a vertical direction.

The output of the H counter 55 is supplied to one of a pair of input terminals of an AND gate 58 so that it may make a read-out enable signal for a horizontal range of 240 dots at the output of the clock generator 54 corresponding to a right corner or a left corner of the parent picture of the video signal, and a signal for 80 H at a lower portion or an upper portion of the parent picture corresponding to the display position of the child picture is supplied as a read-out enable signal for a vertical direction to the other terminal of the AND gate 58.

A timing signal formation circuit 59 outputs clock signals SOCY1 and SOCY2 for reading out from the memories 23 and 24, respectively, when an enable signal supplied thereto by way of the AND gate 58 indicates the logic H, reads out data from a designated area of the memory in accordance with a four field sequence as hereinafter described and outputs video data for the child picture. As a result, the timing signal formation circuit 59 can insert the child picture processed by double speed processing to a predetermined position of the parent picture in cooperation with the switch 13.

FIG. 7 shows an odd/even number discrimination circuit on the memory read-out side for reading out a PinP picture and a discrimination output waveform of the odd/even number discrimination circuit. As seen from FIG. 7, the odd/even number discrimination circuit is formed from a D-type flip-flop (D-FF) which latches an H clock signal of the duty ratio of 50% prior to double speed conversion in response to a rising edge of a V synchronizing signal of a video signal similarly prior to double speed conversion so that it forms an odd/even number discrimination output signal which exhibits 0 for an odd-numbered field but exhibits 1 for an even-numbered field.

FIG. 8 illustrates a relationship in phase between an original signal (A) before conversion and another signal (B) after field double speed conversion. As can be seen from the waveforms (A) and (B), an odd-numbered field indicated by a solid line is read out twice and an even-numbered field indicated by dotted lines is read out twice so that a double speed converted video signal is outputted. In this instance, in order to write and read out a video signal in units of one field into and from the four field sequence memory described above, it is only required that such writing and reading out have such a positional relationship that a same field does not undergo simultaneous writing and reading out accesses. Accordingly, if a written signal is read out at the double speed from the memory beginning with the timing delayed at least by a ½ field as seen from the waveform curves (A) and (B) of FIG. 8, then the field double speed signal does not cause passing of the memory at all.

It should be noted that the 2 V synchronizing signal (waveform (C) in FIG. 8) of the deflection system which makes a synchronizing signal for reading out and the vertical synchronizing signal of the original signal do not always have a fixed phase relationship with each other particularly, when the picture is scrolled in such a zoom mode as mentioned hereinabove. Therefore, in the present invention, in order to partially remove the 2 V synchronizing signal of the deflection system to make the four field sequence of the memory dependable, a window signal of the width of 64 clocks centered at the vertical synchronizing signal of the original signal is formed as seen from the waveform (D) in FIG. 8, and the 2V synchronizing signal of the deflection system is thinned out in accordance with the window signal. Then, a control signal (waveform (F) in FIG. 8) for designating a writing or reading out area of the four field sequence memory is formed in accordance with the thus thinned out vertical synchronizing signal (waveform (E) in FIG. 8). Thus, such control as will not cause passing of the memory address upon field double speed operation is achieved by the control signal.

FIG. 9 shows a table illustrating the control signals for the four field sequence memory. Referring to FIG. 9, the left column indicates a current write memory area (W1, W0) and a current read-out memory area (R1, R0) each in terms of a binary number. Accordingly, in the first row, it is indicated that the write memory area is 0 (00) and also the read-out memory area is 0 (00). The second column indicates a memory area for the next writing operation and another memory area for the next reading out operation each in terms of a binary number when the vertical synchronizing signals for the parent picture and the child picture coincide with each other. However, x represents the write side odd/even number discrimination output (odd-numbered field=1, even-numbered field=0), and y denotes the read-out side odd/even number discrimination output (odd-numbered field 0, even-numbered field=1).

According to the table of FIG. 9, for example, when the current write and read-out memory areas are 00 (0) and 01 (1), respectively, if the write side field is x=0 and the read-out side field is y=1, the memory areas into and from which data are to be written and read out subsequently are designated as 00 and 11, respectively. As a result, when such a timing as when a same field is subjected to writing and reading out as described hereinabove with reference to FIG. 5 comes, the read-out side memory area is changed so that passing of the memory address is inhibited and thereafter writing and reading out will proceed in a regular sequence. The third column indicates a sequence when the vertical synchronizing signals for the parent picture and the child picture do not coincide with each other.

Figure 10:
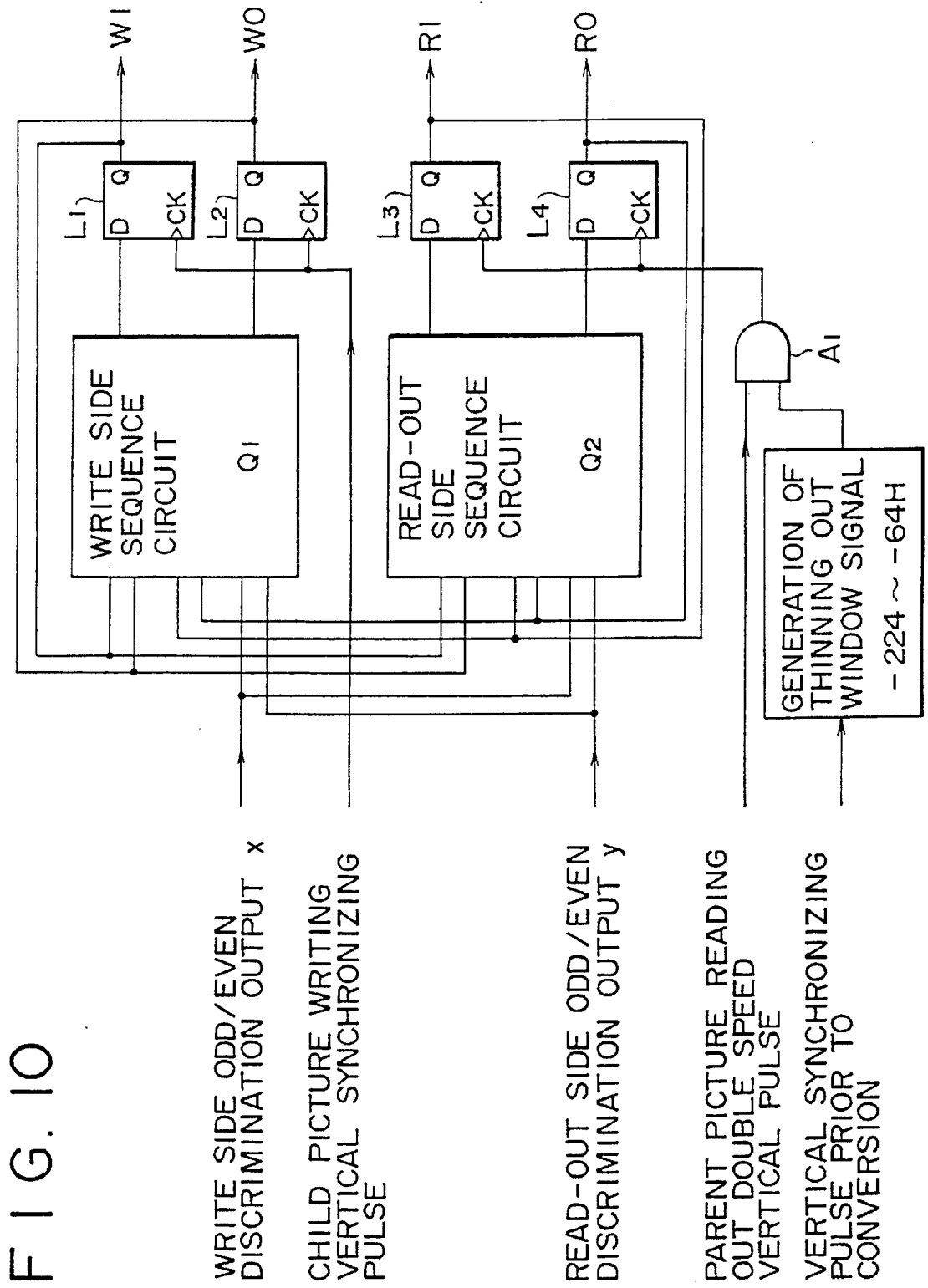
FIG. 10 is a block diagram of a logic circuit for outputting the control signals illustrated in FIG. 9.

FIG. 10 shows in block diagram a logic circuit for outputting control signals (W1, W0 and R1, R0) for designating memory areas indicated in the sequence table of FIG. 9. The control signals (W1, W0) for the write side areas are outputted from a pair of latch circuits L1 and L2 for latching in response to the vertical synchronizing signal for writing the child picture. The outputs (W1, W0) of the latch circuits L1 and L2, the write side odd/even number discrimination output x and the read-out side odd/even number discrimination output y are supplied to a first logic circuit Q1. The control signals are updated successively in response to a timing of the vertical synchronizing signal for the child picture. While also the control signals (R1, R0) for designating a read-out side memory region are formed similarly by means of a logic circuit Q2 and a pair of latch circuits L3 and L4. The latch circuits L3 and L4 latch the outputs of the logic circuit Q2 in response to a signal outputted from an AND gate A1 which thins out the 2 V synchronizing signal for reading out the parent picture with a window signal of the 64 H formed centered at the vertical synchronizing signal prior to conversion as described hereinabove.

Figure 11:
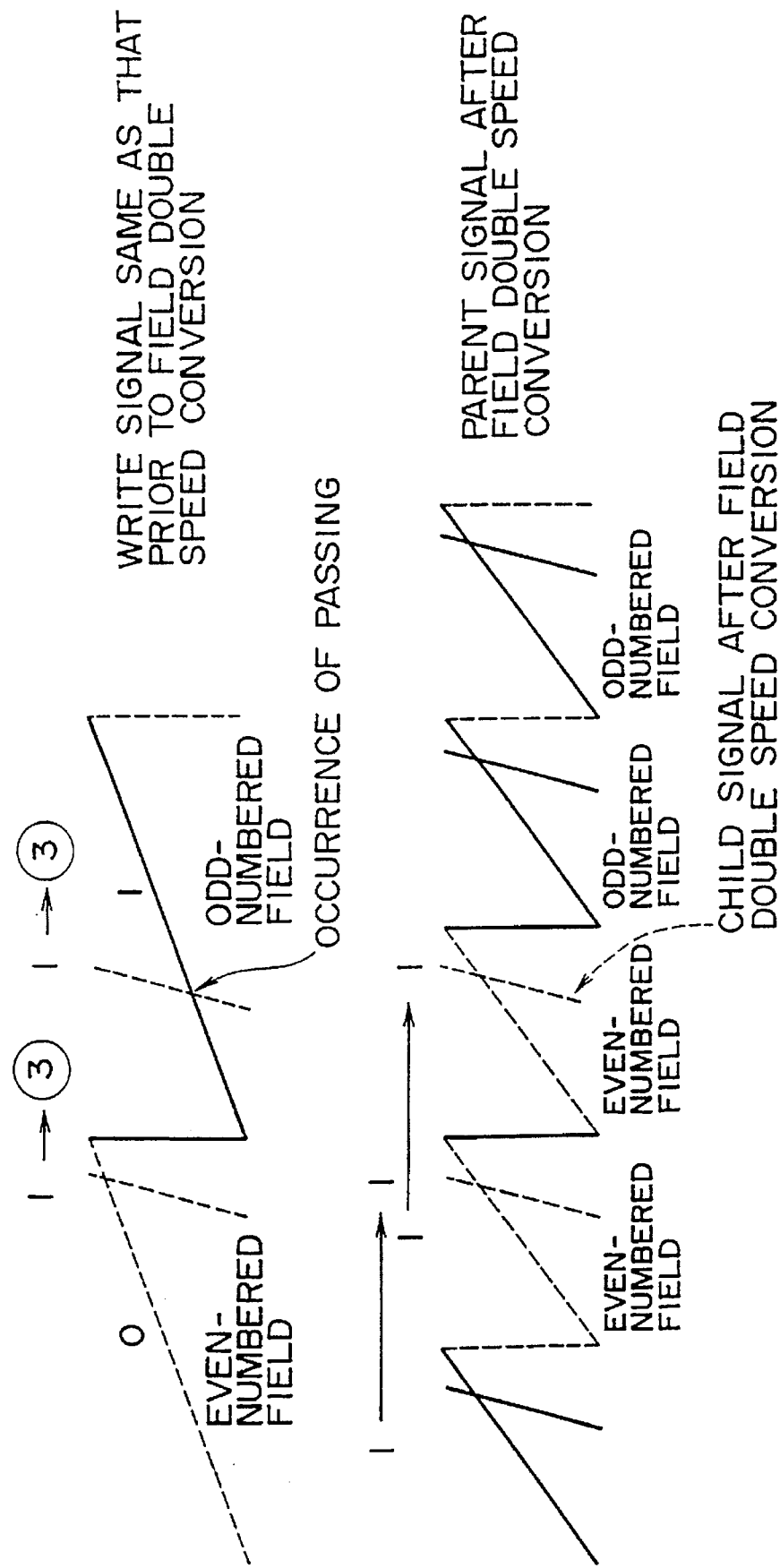
FIG. 11 is a waveform diagram illustrating control of a memory address of a same phase signal using odd-/even-numbered field discrimination.

FIG. 11 illustrates a related method wherein a read-out side sequence is performed in accordance with the vertical synchronizing signal of the original signal and read-out area bits (R1, R0) obtained by the sequence are delayed by one field period of the double speed in accordance with a 2 V pulse signal of the double speed. In the case of a combination of video signals of the same phase or the same video signals, in the sequence table of FIG. 9, the condition wherein the read-out area for an even-numbered field is 1 when the write area for the even-numbered field is 0 is found at the second row. If writing and reading out are performed in the combination, then passing of a memory address does not occur. However, since the read-out side area bits (R1, R0) for displaying the child picture on the parent picture of the field double speed are delayed by one field interval by the double speed V pulse signal, when writing of an odd-numbered field is being performed for the area 1a, second reading out is performed for the same memory area 1, and consequently, passing of the memory address takes place at the center of the child picture.

In FIG. 11, a portion of the signal prior to double speed conversion (same as the write side signal) on the left side with respect to a point at which a PinP address in an even-numbered field crosses corresponds to an upper portion of the child picture, and in that portion, a video signal written immediately before is read out immediately. However, another portion of the signal on the right side corresponds to a lower portion of the child picture, and in the portion, a video signal having been written two fields prior is displayed. In the first reading out operation for an odd-numbered field, since all video signals were written two fields prior, when the video signals involve some movement in the picture, an image immediately prior to then and another image which was written two frames prior are displayed in a superimposed relationship, and consequently, the upper portion of the picture displays a double image. However, when sequence control is performed using the thinned out vertical pulse signal illustrated in FIG. 8, the read-out area changes to the area 3 at the starting point of an odd-numbered field of the double speed, and consequently, the problem of passing of the memory address is avoided.

Figure 12:
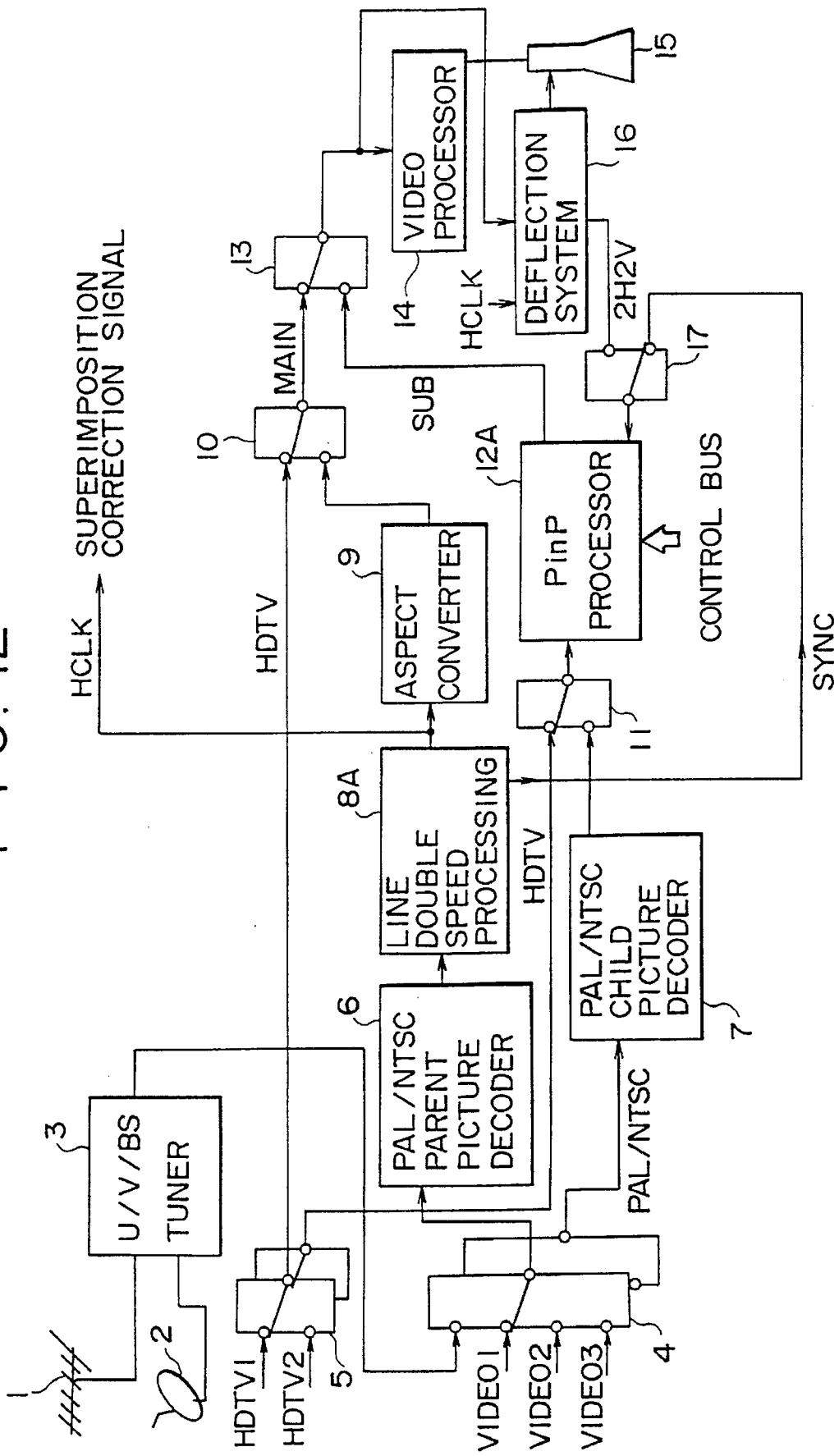
FIG. 12 is a block diagram of a multi-standard receiver to which the present invention is applied.

Subsequently, a second embodiment of the present invention will be described. FIG. 12 shows a general construction of a multi-standard receiver to which the present invention is applied. Elements similar to those of FIG. 1 are denoted by the same reference numerals and overlapping description thereof is omitted herein to avoid redundancy.

Referring to FIG. 12, a line double speed processing circuit 8A converts a 1 H video signal outputted from the decoder 6 into a double speed frequency. In particular, a 1 H horizontal video signal is repetitively read out twice at the double speed by the line double speed processing circuit 8A.

Figure 13:
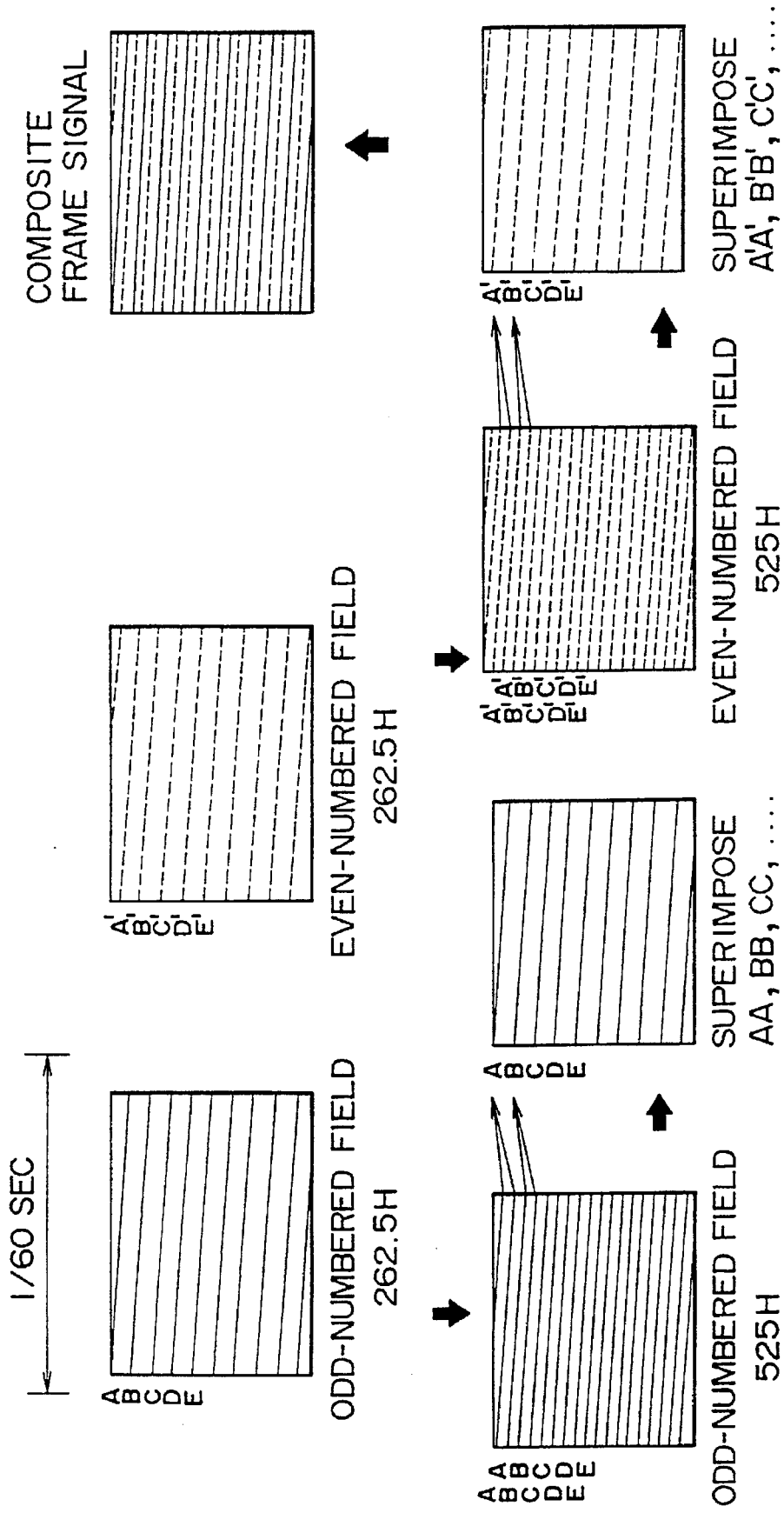
FIG. 13 is a diagrammatic view illustrating a scanning line construction of a superimpose double speed conversion system employed in the multi-standard receiver shown in FIG. 12.

FIG. 13 illustrates such a double line frequency. In the ordinary NTSC system, a video signal for one horizontal image period is converted from an analog signal into a digital signal and written into the memory, and then the signal is read out twice in response to a clock signal of the double speed from the memory and displayed on the screen of the CRT. Accordingly, in a parent picture, 262.5 scanning lines are converted into 525 scanning lines in each of odd- and even-numbered fields. In this instance, scanning lines of 1 H same video signals (AA, BB, CC and A'A', B'B', C'C') successively read out twice are overlapped by a correction circuit to obtain vertical direction so that they may make superimposed lines thereby to equivalently realize an interlace display of 525 lines and 2:1.

The superimposition is achieved in the following manner. In particular, a square wave signal HCLK of the duty ratio of 50% of the period of the original signal is overlapped with a vertical deflection system as shown in FIG. 14, and two beams which display the same signal are superimposed with each other. Consequently, an odd-numbered field and an even-numbered field are interlaced with each other, and an image display picture equivalent to that of the interlace system can be obtained normally at the double line speed. Accordingly, if video data of the child picture are read out in synchronism with such reading out of the video signal by means of a PinP processor 12A described hereinabove and are mixed with a video signal for a parent picture by means of the switch 13, then the child picture signal A of the NTSC system which is 1/9 the size of the parent picture can be displayed or three artificial pictures A, B and C can be displayed as shown in FIGS. 3(A) and 3(B), respectively. Further, also in a zoom mode illustrated in FIGS. 3(A) to 3(D), it is possible to scroll the parent picture by overscanning the video signal of the parent picture to 3/4 times, shifting the display of the child picture to a central portion so as to be displayed there and shifting the artificial vertical synchronizing signal. However, also in this instance, the child picture can be fixed even upon scrolling by taking the displaying timing for the child screen from the vertical synchronizing signal from the deflection system.

Referring back to FIG. 12, the processor 12A writes a video signal for one horizontal period as a signal of 720 dots into a four field sequence memory and successively reads out the signal twice in response to the 2 H pulse signal of the deflection system. In such reading out, when the parent picture is to be successively displayed twice for same lines like AA, BB, CC, . . . , the child picture video signal is controlled so that it may be read out in synchronism with such displaying, and consequently, a child picture display which does not cause reversal of the interlace can be performed.

When the parent picture exhibits an odd-numbered field, the output Q of the latch circuit D–FF of FIG. 7 described hereinabove presents the 0 level, and if the 0 level is used as a selector control signal for the vertical read-out enable signal for displaying a child picture, which is not in a delayed condition, then data for an odd-numbered field of the child picture are displayed in synchronism with the output of the line double speed conversion section for a parent picture. However, when the parent picture exhibits an even-numbered field, the discrimination output presents a 1 level conversely, and a read-out enable signal for an even-numbered field displayed by 1H is selected so that superimposition operates correctly like A'A', B'B', C'C', . . . As a result, a display of a child picture of a high resolution free from a signal drop can be achieved.

Figure 15B:
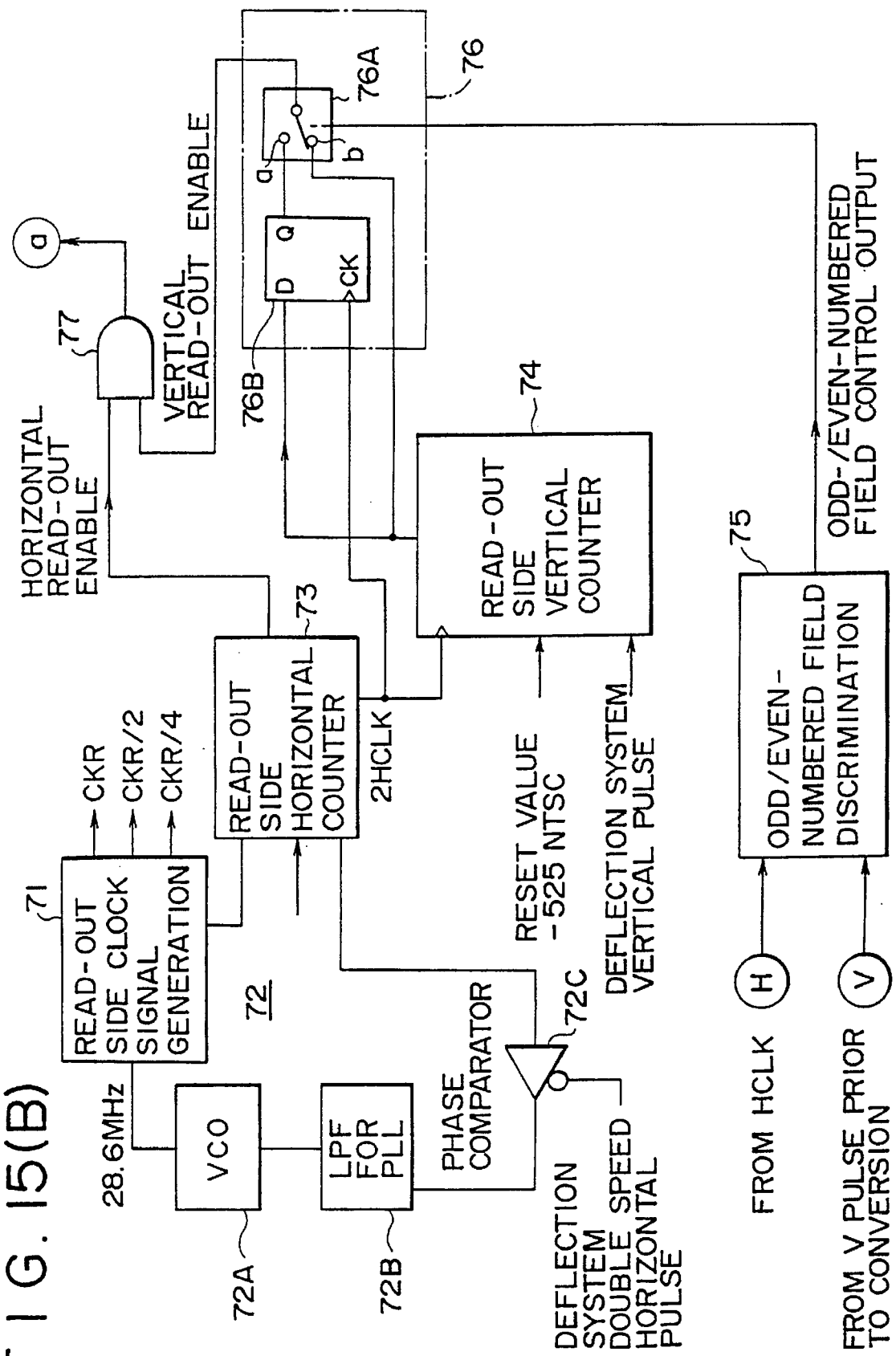

A control circuit for outputting line double speed video data for a child picture from the PinP processor 12A will be described with reference to FIGS. 15A and 15B. The control circuit shown includes a write clock signal generator 61 which applies to the horizontal synchronizing signal (H) of an original signal prior to double speed processing and generates a clock signal, for example, for 910 dots within one horizontal period of a video signal by way of a PLL circuit 62 which includes a VCO 62A, a low-pass filter 62B and a three-state phase comparator 62C.

A write horizontal counter 63 divides the clock signal from the write clock signal generator 61 into 1/900 increments to form a signal HCLK synchronized with the horizontal synchronizing signal prior to conversion and supplies the signal HCLK to a write vertical counter 64. Further, the write horizontal counter 63 supplies a signal corresponding to 240 dots of a position at which a child picture is present as a horizontal write enable signal to an AND gate 66. The write vertical counter 64 which counts the signal HCLK from the write horizontal counter 63 detects a section of 80 H at a lower portion of the screen at which the child picture is present, and supplies a vertical enable signal to the other terminal of the AND gate 66. Then, a write clock generator 67 is controlled by the logical AND of the two enable signals supplied to the AND gate 66 so that data of an area of the video signal corresponding to the child picture are written into a RAM 68 in response to the clock signal outputted for the enable signal period.

The vertical pulse generator 65 counts the output of the horizontal counter 63 and generates a stable V pulse signal in order to keep the write timing into the memory even when no signal is received. It is to be noted that, for the NTSC system, the vertical pulse signal is generated at the dividing ratio of 263, and V pulses synchronized with it are outputted immediately.

Information data of the child picture written in the video RAM 68 is read out with reference to a 2 H pulse signal and a V pulse signal of the deflection system which scans at the double speed. In particular, as seen in FIG. 15, a read-out clock signal generator 71 generates a clock signal for 910 dots for one horizontal period in synchronism with the 2 H pulse signal of the deflection system by means of a VCO 73A, a low-pass filter 73B and a phase comparator 73C which constitute a PLL circuit. Similar to the writing side, the clock signal is supplied to a read-out horizontal counter 73, by which it is divided into 1/910 increments to produce a 2HCLK signal, and the 2HCLK signal is supplied to a read-out vertical counter 74. Consequently, an area of the clock signal at a position corresponding to a child picture of the display video signal is supplied as an enable signal in a horizontal direction to an AND gate 77.

The read-out vertical counter 74 is reset in response to a V pulse of the deflection system to establish synchronization in a vertical direction. Even when such a V pulse is not received, for example, in the case of the NTSC system, the read-out vertical counter 74 is reset at the value of 525 thereof so that a stable operation is achieved. If a vertical enable signal is formed from a count value corresponding to a lower portion of the display position of the parent picture and supplied to the AND gate 77, then data of the child picture stored in the video RAM 68 are read out by a read-out clock generator 78 based on designation by the output of the AND gate 77 and are composed with the parent picture by the switch 13 so as to be displayed.

In the present embodiment, an odd/even number discrimination circuit 75 and an even-number 1 H delay circuit 76 are provided so that, in an even-numbered field, a vertical read-out enable signal outputted from the vertical counter 74 is delayed by 1 H by them before it is supplied to the AND gate 77. The odd/even number discrimination circuit 75 is equivalent to the D–FF circuit described hereinabove with reference to FIG. 7 for comparing the phases of a vertical synchronizing signal of a video signal prior to double speed processing and an HCLK signal, and in response to the output signal of the odd/even number discrimination circuit 75, a switch 76A of the even 1 H delay circuit 76 is changed over to form a vertical enable signal delay by 1 H from a latch circuit 76B.

As a result, when a field double speed child picture is displayed on a parent picture which basically is a non-interlace picture as a result of a superimposition line double speed, superimposition of the child picture coincides with superimposition of the parent picture. Consequently, a display of the child picture free from a signal drop can be achieved.

Also in the second embodiment, passing of the memory address may possibly occur with the four field sequence memory as described above. Therefore, also in the present embodiment, write and read-out areas of the four sequence field memory are designated using the sequence table of FIG. 9 and the control circuit of FIG. 10. In the present embodiment, however, the odd/even number discrimination output on the writing side is inverted and the vertical synchronizing pulse signal prior to double speed conversion is used as the latching output on the read-out side.

Having now fully described the invention, it will be apparent to one of ordinary skill in the art that many changes and modifications can be made thereto without departing from the spirit and scope of the invention as set forth herein.

What is claimed is:

1. A video display apparatus, comprising:

frequency conversion means for converting a first video signal of a parent picture into a second video signal of a double speed field frequency;

aspect ratio conversion means for converting an aspect ratio of the second video signal whose field frequency has been converted by said frequency conversion means and producing a third video signal having a predetermined aspect ratio;

child picture processing means including a four field sequence memory for converting a fourth video signal of a child picture into a fifth video signal of the double speed field frequency;

display means for inserting the fifth video signal output from said child picture processing means into the third video signal output from said aspect ratio conversion means and for displaying a combined video signal on a scanning screen, said display means including a deflection system for generating a double-speed vertical synchronizing signal and a double-speed horizontal synchronizing signal by using at least the fifth video signal converted from the fourth video signal of the child picture and for controlling a scanning of the Scanning screen;

thinning out means for thinning out a double speed synchronizing signal for scanning said display means by using a window signal of a predetermined width centered at a vertical synchronization position prior to conversion to the double speed; and a control circuit for forming an area control signal for said four field sequence memory of said child picture processing means by using a thinned out vertical synchronization pulse signal output from said thinning out means and the double-speed vertical synchronizing and horizontal synchronizing signals from said deflection system, for reading out said four field sequence memory twice for each field in accordance with the area control signal, and for controlling write and read-out areas of said four field sequence memory in accordance with the area control signal so as to display the child picture free from read/write address passing in said four field sequency memory.

2. A display apparatus according to claim 1, wherein the predetermined width is equal to a scanning time of a horizontal scanning line upon scrolling of the parent picture.

3. A display apparatus according to claim 2, wherein said four field sequence memory has a first area for recording an odd-numbered field of a first frame, a second area for recording an even-numbered field of the first frame, a third area for recording an odd-numbered field of a second frame, and a fourth area for recording an even-numbered field of the second frame.

4. A display apparatus according to claim 3, wherein the four field sequence is formed in accordance with an odd/even number discrimination signal obtained from a write side video signal input of said control circuit, an odd/even number discrimination signal of a read-out side video signal, a writing vertical synchronizing signal for the child picture, the double speed vertical synchronizing signal from said deflection system, and the thinned out vertical synchronizing pulse signal.

5. A display apparatus, comprising:

line frequency conversion means for converting a first video signal of a parent picture for one horizontal period into a second video signal of a double speed line frequency;

aspect ratio conversion means for converting an aspect ratio of the second video signal whose line speed has been doubled by said line frequency conversion means and producing a third video signal having a predetermined aspect ratio;

child picture processing means including a memory for converting a fourth video signal of a child picture into a fifth video signal of the double speed line frequency in units of a field;

display means for inserting the fifth video signal output from said child picture processing means into the third video signal of the double speed line frequency output from said aspect ratio conversion means and for displaying a combined video signal on a scanning screen, said display means including a deflection system for generating a double-speed vertical synchronizing signal and a double-speed horizontal synchronizing signal by using at least the fifth video signal converted from the fourth video signal of the child picture and for controlling a scanning of the scanning screen; and a control circuit for discriminating a field of the video signal read out by said child picture processing means using a synchronizing signal prior to the double speed conversion and delaying outputting of the picture displaying timing for an even-numbered field for one horizontal period and for reading out said memory twice for each field in response to the double speed vertical synchronizing and horizontal synchronizing signals from said deflection system.

6. A display apparatus according to claim 5, wherein the double line speed processing by said child picture processing means is performed by using a four field sequence memory.

7. A display apparatus according to claim 6, wherein the four field sequence is formed in accordance with an odd/even number discrimination signal obtained from a write side video signal input to said control circuit, an odd/even number discrimination signal of a read-out side video signal, a writing vertical synchronizing signal for the child picture, and a vertical synchronizing signal for reading out the child picture prior to the double speed conversion.

8. A video signal processing circuit for a display apparatus, comprising:

frequency conversion means for converting a first video signal of a parent picture into a second video signal of a double speed field frequency;

aspect ratio conversion means for converting an aspect ratio of the second video signal whose field frequency has been converted by said frequency conversion means and producing a third video signal having a predetermined aspect ratio;

child picture processing means including a four field sequence memory for converting a fourth video signal of a child picture into a fifth video signal of the double speed field frequency;

display means for inserting the fifth video signal output from said child picture processing means into the third video signal output from said aspect ratio conversion means and for displaying a combined video signal on a scanning screen, said display means including a deflection system for generating a double-speed vertical synchronizing signal and a double-speed horizontal synchronizing signal by using at least the fifth video signal converted from the fourth video signal of the child picture and for controlling a scanning of the scanning screen;

thinning out means for thinning out a double speed synchronizing signal for scanning said display means by using a window signal of a predetermined width centered at a vertical synchronization position prior to conversion to the double speed; and a control circuit for forming an area control signal for said four field sequence memory of said child picture processing means by using a thinned out vertical synchronization pulse signal output from said thinning out means and the double-speed vertical synchronizing and horizontal synchronizing signals from said deflection system, for reading out said four field sequence memory twice for each field in accordance with the area control signal, and for controlling write and read-out areas of said four field sequence memory in accordance with the area control signal so as to display the child picture free from read/write address passing in said four field sequency memory.

9. A video signal processing circuit for a display apparatus according to claim 8, wherein the predetermined width is equal to a scanning time of a horizontal scanning line upon scrolling of the parent picture.

10. A video signal processing circuit for a display apparatus according to claim 9, wherein said four field sequence memory has a first area for recording an odd-numbered field of a first frame, a second area for recording an even-numbered field of the first frame, a third area for recording an odd-numbered field of a second frame, and a fourth area for recording an even-numbered field of the second frame.

11. A video signal processing circuit for a display apparatus according to claim 10, wherein the four field sequence is formed in accordance with an odd/even number discrimination signal obtained from a write side video signal input of said control circuit, an odd/even number discrimination signal of a read-out side video signal, a writing vertical synchronizing signal for the child picture, the double speed vertical synchronizing signal from said deflection system, and the thinned out vertical synchronizing pulse signal.

12. A video signal processing circuit for a display apparatus, comprising:

line frequency conversion means for converting a first video signal of a parent picture for one horizontal period into a second video signal of a double speed line frequency;

aspect ratio conversion means for converting an aspect ratio of the second video signal whose line speed has been doubled by said line frequency conversion means and producing a third video signal having a predetermined aspect ratio;

child picture processing means including a memory for converting a fourth video signal of a child picture into a fifth video signal of the double speed line frequency in units of a field;

display means for inserting the fifth video signal output from said child picture processing means into the third video signal of the double speed line frequency output from said aspect ratio conversion means and for displaying a combined video signal on a scanning screen, said display means including a deflection system for generating a double-speed vertical synchronizing signal and a double-speed horizontal synchronizing signal by using at least the fifth video signal conversed from the fourth video signal of the child picture and for controlling a scanning of the scanning screen; and a control circuit for discriminating a field of the video signal read out by said child picture processing means using a synchronizing signal prior to the double speed conversion and delaying outputting of the picture displaying timing for an even-numbered field for one horizontal period and for reading out said memory twice for each field in response to the double speed vertical synchronizing and horizontal synchronizing signals from said deflection system.

13. A video signal processing circuit for a display apparatus according to claim 12, wherein the double line speed processing by said child picture processing means is performed by using a four field sequence memory.

14. A video signal processing circuit for a display apparatus according to claim 13, wherein the fourth field sequence is formed in accordance with an odd/even number discrimination signal obtained from a write side video signal input of said control circuit, an odd/even number discrimination signal of the read-out side video signal, a writing vertical synchronizing signal for the child picture, and a vertical synchronizing signal for reading out the child picture prior to the double speed conversion.

* * * * *

UNITED STATES PATENT AND TRADEMARK OFFICE
CERTIFICATE OF CORRECTION

PATENT NO. : 5,627,598
DATED : May 06, 1997
INVENTOR(S) : Susumu Tsuchida

It is certified that error appears in the above-identified patent and that said Letters Patent is hereby corrected as shown below:

Col.4, line 32, after "showing" insert --the--
Col.10, line 9, change "1a," to --1, a--
Col.11, line 56, change "1/900" to --1/910--

In the claims:
Col.13, line 35, change "Scanning" to --scanning--
Col.16, line 24, change "conversed" to --converted--

Signed and Sealed this

Ninth Day of June, 1998

Attest:

BRUCE LEHMAN

*Attesting Officer*    *Commissioner of Patents and Trademarks*